US008824678B2

(12) United States Patent
Ochikubo et al.

(10) Patent No.: US 8,824,678 B2
(45) Date of Patent: Sep. 2, 2014

(54) MAC ADDRESS ANONYMIZER

(75) Inventors: Craig Ochikubo, Venice, CA (US); Prasanna Desai, Elfin Forest, CA (US); Matthew Fischer, Mountain View, CA (US); Raymond Hayes, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 109 days.

(21) Appl. No.: 13/080,399

(22) Filed: Apr. 5, 2011

(65) Prior Publication Data

US 2012/0257753 A1    Oct. 11, 2012

(51) Int. Cl.
*H04K 1/00* (2006.01)
*H04W 12/02* (2009.01)
*H04L 29/06* (2006.01)

(52) U.S. Cl.
CPC ............. *H04W 12/02* (2013.01); *H04L 63/08* (2013.01)
USPC .................................... 380/270; 726/2; 726/6

(58) Field of Classification Search
CPC ............................... H04W 12/02; H04L 63/08
USPC ............................ 726/2–6; 370/310, 328, 338; 709/223–226; 380/270
See application file for complete search history.

(56) References Cited

U.S. PATENT DOCUMENTS

| | | | | |
|---|---|---|---|---|
| 7,319,681 B2* | 1/2008 | Park | | 370/331 |
| 7,359,989 B2* | 4/2008 | Orava et al. | | 709/245 |
| 7,457,300 B2* | 11/2008 | Christensen et al. | | 370/401 |
| 7,548,563 B1* | 6/2009 | Orr | | 370/476 |
| 7,653,920 B2* | 1/2010 | Chen | | 725/9 |
| 7,680,110 B2* | 3/2010 | Goto et al. | | 370/394 |
| 7,783,756 B2* | 8/2010 | Choyi et al. | | 709/225 |
| 7,848,327 B2* | 12/2010 | Jain et al. | | 370/392 |
| 7,926,100 B2* | 4/2011 | Lee et al. | | 726/13 |
| 7,962,958 B2* | 6/2011 | Robert et al. | | 726/23 |
| 8,009,626 B2* | 8/2011 | Anjum | | 370/331 |
| 8,132,008 B2* | 3/2012 | Fisher et al. | | 713/168 |
| 2003/0177267 A1* | 9/2003 | Orava et al. | | 709/245 |
| 2005/0050352 A1* | 3/2005 | Narayanaswami et al. | ... | 713/201 |
| 2006/0104243 A1* | 5/2006 | Park | | 370/331 |
| 2006/0120317 A1* | 6/2006 | Zheng | | 370/315 |
| 2006/0274643 A1* | 12/2006 | Choyi et al. | | 370/216 |
| 2007/0019609 A1* | 1/2007 | Anjum | | 370/349 |
| 2007/0201698 A1* | 8/2007 | Huh et al. | | 380/256 |
| 2009/0074187 A1* | 3/2009 | Inoue et al. | | 380/270 |
| 2009/0290555 A1* | 11/2009 | Alpert et al. | | 370/331 |
| 2010/0110975 A1* | 5/2010 | Cagenius | | 370/328 |
| 2010/0142450 A1* | 6/2010 | Kangude et al. | | 370/328 |
| 2010/0142709 A1* | 6/2010 | Robert et al. | | 380/270 |
| 2011/0029370 A1* | 2/2011 | Roeding et al. | | 705/14.38 |
| 2011/0107417 A1* | 5/2011 | Balay et al. | | 726/22 |
| 2011/0200022 A1* | 8/2011 | Annamalai | | 370/338 |
| 2012/0023242 A1* | 1/2012 | Pirbhai et al. | | 709/228 |
| 2012/0213211 A1* | 8/2012 | Remaker | | 370/338 |

OTHER PUBLICATIONS

Inoue et. al. Transient MAC Address Scheme for Untraceability and DOS Attack Resiliency on Wireless Network, 2005.*
Hauser, Protecting Virtual Identities in Mobile IP-based Communication, 2007.*
Gruteser et. al., Enhancing Location Privacy in Wireless LAN Through Disposable Interface Identifiers: A Quantitative Analysis, 2005.*
Narten et. al., RFC 4941, 2007.*
"IEEE 802.11p: Towards an International Standard for Wireless Access in Vehicular Environments", by Jiang et al. 2008.*

* cited by examiner

*Primary Examiner* — Saleh Najjar
*Assistant Examiner* — Oleg Korsak
(74) *Attorney, Agent, or Firm* — Sterne, Kessler, Goldstein & Fox P.L.L.C.

(57) ABSTRACT

Methods and systems for generating anonymous MAC addresses and determining permanent MAC addresses from anonymous MAC addresses are disclosed. Permanent MAC addresses may be associated with a location in a location database. Generating anonymous MAC addresses may protect user privacy and allow manufacturers and users of wireless access points to control their inclusion in location databases.

17 Claims, 7 Drawing Sheets

| 202 | 204 |
| --- | --- |
| MAC Address | Location |
| 05:00:00:00:00:01 | (38.888995, -77.035167) |
| 03:00:00:06:00:0F | (38.887905, -77.009000) |

MAC ADDRESS ANONYMIZER

BACKGROUND

1. Field of the Invention

The present invention relates to the field of wireless communications.

2. Background Art

Wireless access points, such as wireless routers, are associated with a media access control (MAC) address. Certain location databases exist that store the location of a wireless access point and the MAC address of the wireless access point. Such location databases may be used by mobile telephones and other handheld devices for location based services. For example, if GPS is unavailable for some reason, a mobile telephone may use assisted GPS technologies (A-GPS) to approximate the location of the mobile telephone. Such A-GPS technologies use Wi-Fi to determine one or more closest access points, determine the MAC address of the access points, and look up the location of the access points in a location database.

BRIEF SUMMARY

Disclosed herein are systems for creating an anonymous MAC address in a wireless access point. The system may include a wireless transceiver having an associated permanent MAC address. The system may also include one or more secret keys. The system may further include a processor, configured to generate an anonymous MAC address in part by mutating a portion of the permanent MAC address using the secret key. The wireless transceiver may then broadcast the anonymous MAC address. The system may also include a counter device. The processor may further be configured to generate the anonymous MAC address by mutating a portion of the permanent MAC address using the secret key and including the counter value.

Also disclosed herein are systems for determining a permanent MAC address from a detected anonymous MAC address. The system may include a receiver that detects a MAC address associated with an access point. The system may also include one or more secret keys. The system may further include a processor, configured to identify a detected MAC address as an anonymous MAC address. The processor may further be configured to determine a permanent MAC address from the anonymous MAC address by resolving at least a portion of the anonymous MAC address, using a secret key.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Networked devices following various standards are identified by a unique identifier known as a media access control address or MAC address. For example, wireless access points, wired network devices, and wireless network devices all may be identified by an associated MAC address. MAC addresses are generally assigned by a manufacturer of a network device. Such MAC addresses may be typically stored in hardware, memory, firmware, or other storage of the networked device.

Figures 1, 2:
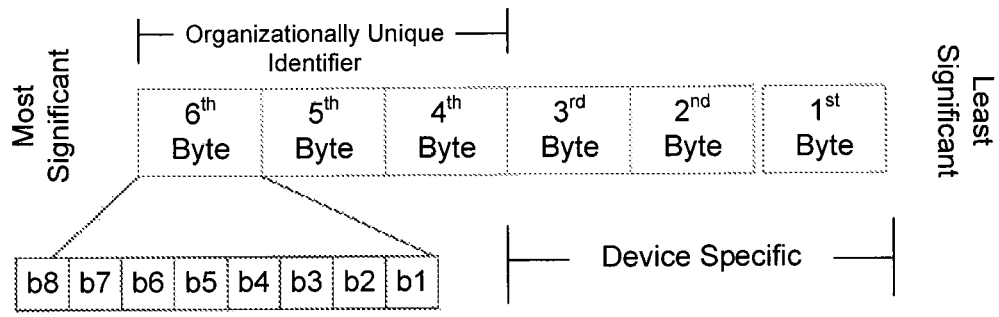
FIG. 1 is a diagram of a typical MAC address.
FIG. 2 is a portion of an exemplary location database.

A MAC address complying with certain standards consists of 6 bytes or 48 bits of information. Each byte of a MAC address, expressed in hexadecimal format, may be expressed in binary format as eight bits. The standardized MAC address format may be seen in FIG. 1. As seen in FIG. 1, each byte (in this case, the first byte) is composed of eight bits (b1 through b8). The first three bytes of a MAC address (the three most significant bytes) may identify the manufacturer or other organization associated with the networked device and may be known as the organizationally unique identifier (OUI). OUIs are issued by the Institute of Electrical and Electronics Engineers (IEEE). The last three bytes (the three least significant bytes) of a MAC address may be specific to the networked device. Together, the six bytes of the MAC address serve as a unique identifier for the networked device. MAC addresses typically appear in a human readable format as six pairs of hexadecimal digits, separated by colons or dashes, as in FIG. 1.

MAC addresses may be globally unique or locally administered. For globally unique addresses, the first three bytes are set to the OUI of the manufacturer. In a globally unique address, the second least significant bit of the most significant byte is set to a value of 0. For locally administered addresses, the second least significant bit of the most significant byte is set to a value of 1. In the MAC address format of FIG. 1, bit b2 of the most significant byte would be set to 0 or 1, depending on whether the MAC address is globally unique or locally administered, respectively.

Various location databases exist that are provided by location service providers. These location databases may associate broadcasted MAC addresses with geographic locations. Location databases may be created in part by driving or walking around various locations with a mobile device such as a laptop, detecting a MAC address of a location, and geocoding the location of the MAC address. For example, a location service provider may assign an employee to drive through a neighborhood with a laptop, detect the MAC address of various businesses and houses, and associate detected MAC addresses with locations or physical addresses. Similarly, a location service provide may assign an employee to walk through a shopping mall with a handheld mobile device, configured to detect MAC addresses of access points and associate them with a location in the mall. These MAC addresses and locations may then be stored in a database.

A portion of an exemplary location database is shown in FIG. 2. Column 202 of FIG. 2 lists various MAC addresses. Column 204 of FIG. 2 lists the approximate location of each MAC address. The location may be provided as GPS coordinates, latitude/longitude coordinates (as in FIG. 2), street address, city address, or any other method of providing location information Location databases with MAC addresses and associated locations may be useful to users of mobile devices. For example, a user with a mobile telephone may wish to determine his or her location on a map. The mobile telephone may be equipped with GPS technology, which typically uses global positioning satellites to determine the location of a device equipped with a GPS chip. However, in certain situations, GPS technology may be unavailable to determine a user's location. GPS positioning may be difficult or impossible if a user is indoors, for example. Further, if a user is in a city, GPS signals may suffer multipath propagation if the signals bounce off of buildings. Additionally, certain mobile devices are not equipped with GPS technology. However, users of such devices still desire to use location based services.

Assisted GPS technology, or A-GPS, may alleviate some of these issues. A-GPS technology uses location databases that may be created as described above. Thus, a location database with MAC addresses and associated locations may be used to determine the location of the user. A wireless device containing a radio that broadcasts and receives 802.11 signals may be configured to query nearby wireless access points to determine the MAC address of one or more nearby access points. MAC addresses that are found to be nearby may be searched in a location database to determine the approximate position of the wireless device. Similar techniques may be known as Wi-Fi positioning systems.

Such location databases are not without their own issues, however. Many users are concerned with the privacy of personally identifying information. Thus, a database which matches a MAC address to a location has the potential to violate user privacy. For example, an entry in a location database may match the MAC address of a router in a private home to a location. Further, certain manufacturers of wireless access points may wish to be excluded from a particular location database for business reasons or allow for the purchasers of their wireless access points to have the ability to be excluded from location databases. Certain manufacturers of wireless access points may wish to exclude others from using their wireless access points to determine the location of a mobile device.

Thus, in order to protect user privacy and allow wireless access point manufacturers and their users to decide whether to be included in a location database, systems and methods of broadcasting anonymous MAC addresses are disclosed herein. A wireless access point may broadcast an anonymous MAC address that changes according to an interval. The interval may be measured in hours, days, weeks, or any other length of time. Because the MAC address constantly changes, a location database that stores the anonymous MAC address and an associated location cannot use the MAC address as a reliable method of providing location based services, if the MAC address has changed between the time the MAC address was added to the location database and the time a user seeks to determine her location.

Further, systems and methods of determining a permanent MAC address associated with an access point are disclosed. The permanent MAC address of an access point and the location of the access point may be stored in a location database. The access point may broadcast an anonymous MAC address. In certain situations, business partners of the manufacturer may be provided with the ability to determine the permanent MAC address of the associated access point. Thus, by determining the permanent MAC address of the associated access point, a mobile device user may be able to determine an accurate location based on the permanent MAC address.

Figure 3:
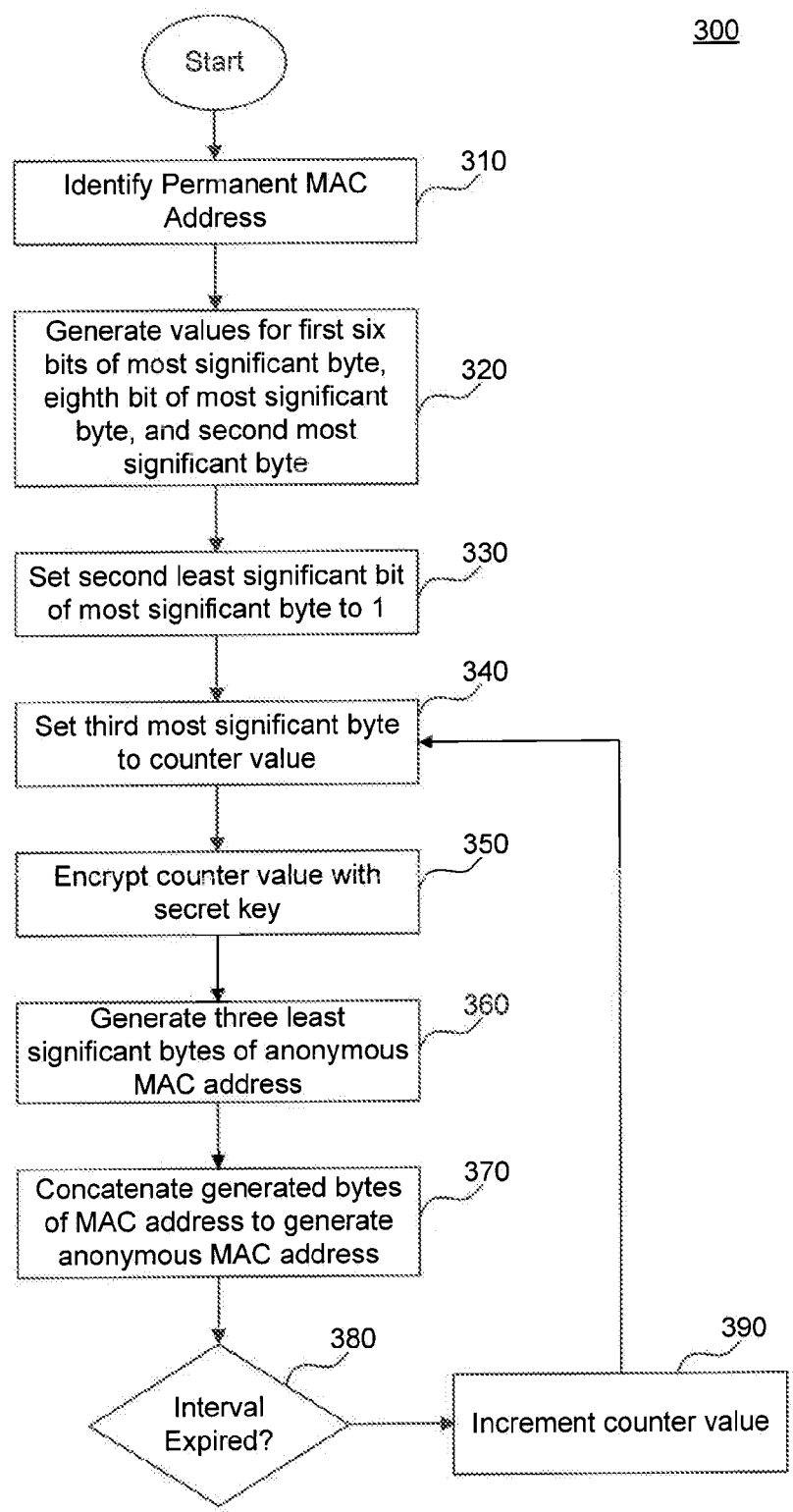
FIG. 3 is a flow diagram of an exemplary method of generating an anonymous MAC address.

An anonymous MAC address may be generated in accordance with embodiments using one or more elements of a permanent MAC address. FIG. 3 is a diagram of a method 300 for generating an anonymous MAC address in accordance with embodiments. Method 300 may be implemented on a wireless access point.

At block 310, a permanent MAC address is identified. The permanent MAC address may be associated with the wireless access point implementing method 300. The permanent MAC address may have a globally unique OUI in accordance with the IEEE standard for the three most significant bytes of the MAC address, and have the three least significant bytes of the MAC address assigned by the manufacturer of the wireless access point or other device.

At block 320, values for the first six bits of the most significant byte, the eighth bit of the most significant byte, and the eight bits of the second most significant byte, are generated. These fifteen generated bits may correspond to a unique pattern selected or specified by a manufacturer who wishes to create an anonymous MAC address. For example, all MAC addresses for all wireless access points by one manufacturer may be set to the same fifteen bits. These fifteen generated bits may be stored in a memory of the wireless access point.

At block 330, the second least significant bit of the most significant byte of the anonymous MAC address is set to 1. In accordance with the IEEE standard, this denotes that the generated MAC address is locally administered. Setting this bit to 1 ensures that the generated anonymous MAC address does not conflict with a permanent MAC address.

At block 340, the third most significant byte of the anonymous MAC address is set to a counter value. Because the value of a byte can range between 0 and 255, the counter value is set to between 0 and 255. The counter value may change according to a desired time interval. For example, the first generated MAC address may have a counter value of 0. After 24 hours, a week, or any other time period, the counter value may be incremented to a value of 1. In an embodiment, when the counter value reaches 255, it restarts at a value of 0.

At blocks 350 and 360, the three least significant bytes of the anonymous MAC address are generated. The manufacturer who wishes to create an anonymous MAC address may previously create and store a secret key. The counter value generated at block 340 may be provided to an AES block cipher, along with the secret key, to generate an output value, at block 350.

At block 360, the output value generated at block 350 and the three least significant bytes of the permanent MAC address may be provided to an exclusive disjunction, or XOR, operation. The output of the XOR operation may be used as the three least significant bytes of the anonymous MAC address.

At block 370, the anonymous MAC address is generated by concatenating the bits generated at block 320, the second least significant bit of the most significant byte (with a value of 1), the counter value set at block 340, and the result of the operation of block 360. The anonymous MAC address may be broadcast by the wireless access point implementing method 300.

At block 380, if an interval has expired, the counter value is incremented. Blocks 340, 350, 360 and 370 may be repeated to generate a new anonymous MAC address. The new anonymous MAC address may then be broadcast.

In an embodiment, the secret key used at block 350 is a 128 bit encryption key. Because the counter value is only of a length of 8 bits, in order to properly encrypt the counter value, the counter value may be padded to a length of 128 bits. Additionally, because the three least significant bytes of the permanent MAC address are only 24 bits long, the three least significant bytes may be padded to a length of 128 bits to be provided to the XOR operator. Other bit lengths could be used as will be understood by those skilled in the art.

In an embodiment, the counter value generated at block 350 may be provided to a different encryption algorithm. For example, the counter value may be provided to a hash function. Other encryption algorithms may be known to those skilled in the art.

In an embodiment, prior to broadcasting the anonymous MAC address, a wireless access point implementing method 300 may scan nearby access points to ensure that the generated anonymous MAC address is not the same as a MAC address currently being broadcast by another access point. If the generated anonymous MAC address is a duplicate, the counter value may be incremented and a new anonymous MAC address may be generated.

Figure 4:
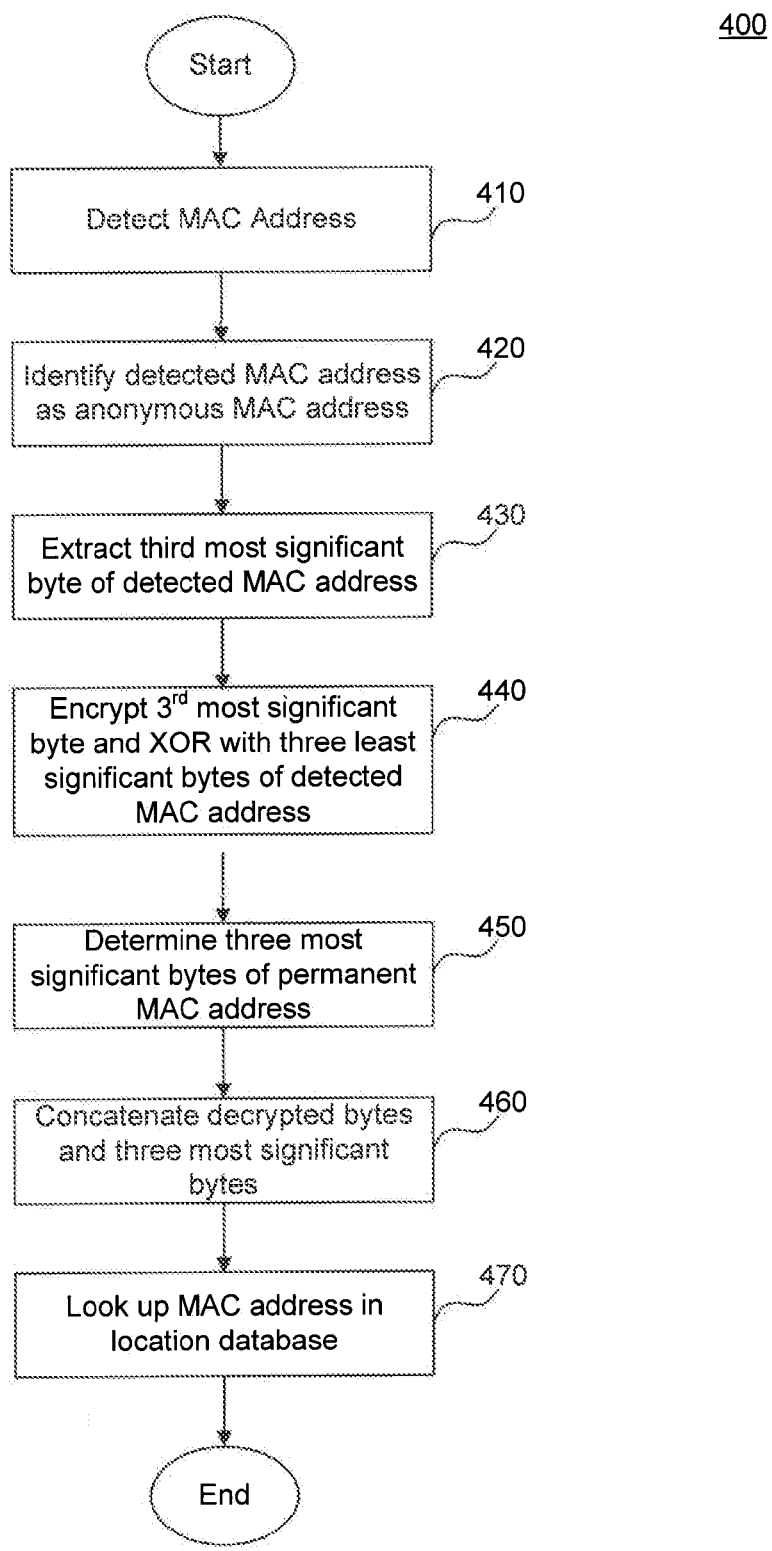
FIG. 4 is a flow diagram of an exemplary method of determining a permanent MAC address.

FIG. 4 is a diagram of a method 400 for determining a permanent MAC address from an anonymous MAC address, in accordance with embodiments. Method 400 may be performed by a location aware device, such as a cellular phone utilizing A-GPS technology, to determine the approximate location of the device.

At block 410, a MAC address is detected. The detected MAC address may be associated with a wireless access point at a particular location.

At block 420, the MAC address detected at block is determined to be an anonymous MAC address. The determination may be based on the first sixteen bits of the detected MAC address. For example, the second least significant bit of the most significant byte may be detected to be a value of 1. Based on this value, the detected MAC address may be determined to be a locally administered MAC address. The remainder of the first sixteen bits may correspond to a unique pattern specified by a manufacturer, in accordance with block 320 of method 300. Other bit configurations could be used as will be understood by those skilled in the art.

At block 430, the third most significant byte of the detected MAC address is extracted. In accordance with the above embodiments, the third most significant byte of the detected MAC address may correspond to a counter value. The value of the third most significant byte may be provided to an AES block cipher, along with a previously stored secret key. In accordance with an embodiment, the secret key corresponds to the encryption key used in block 350 of method 300. For example, a manufacturer of wireless access points and mobile device components may ensure that both types of devices have the same secret key. Additionally, a manufacturer of wireless access points may partner with a second manufacturer of mobile devices, and provide the secret key used to generate anonymous MAC addresses so that the mobile devices by the second manufacturer can use a particular location database.

At block 440, the three least significant bytes of the detected MAC address, along with the output value of the AES block cipher, may be provided to an XOR operator, which performs an XOR operation with the value of the output of the AES block cipher and the three least significant bytes of the detected MAC address. The output of the XOR operation may represent the three least significant bytes of the permanent MAC address.

At block 450, the three most significant bytes of the permanent MAC address may be determined based on the unique pattern specified by the manufacturer. For example, a lookup table may be stored in memory on a mobile device implementing method 400. The lookup table may assist in determining the three most significant bytes of the permanent MAC address that correspond to the unique pattern.

At block 460, the three most significant bytes determined at block 450 and the three least significant bytes determined at block 440 are concatenated to determine the permanent MAC address.

At block 470, the permanent MAC address may be used to determine the location of a mobile device that has determined the permanent MAC address by looking it up in a location database as detailed above.

Figure 5:
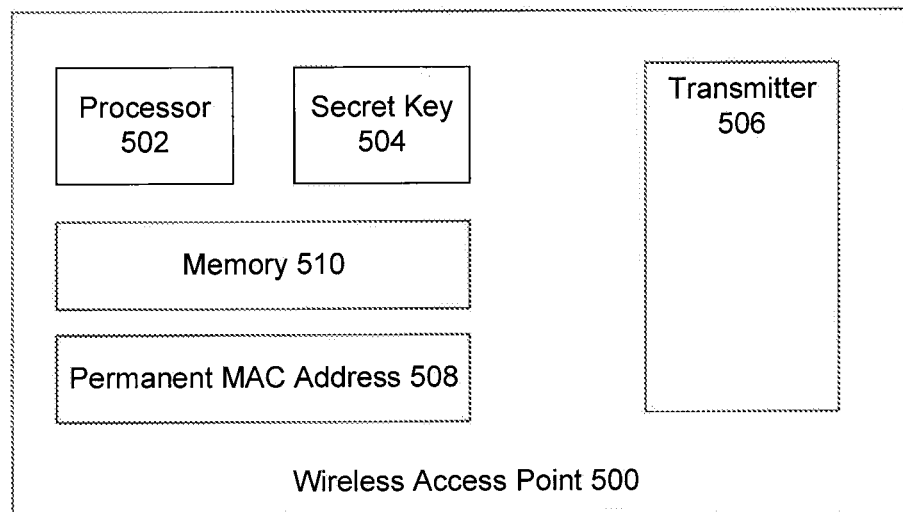
FIG. 5 is a diagram of an exemplary wireless access point.

FIG. 5 is a diagram of a wireless access point 500 in accordance with embodiments. Wireless access point 500 may have a permanent or burned-in MAC address in accordance with the IEEE 802 standard. The permanent MAC address may uniquely identify the wireless access point in accordance with the manufacturer of the wireless access point and the IEEE standard. Wireless access point 500 may be a Wi-Fi access point, a WiMax access point, or any other type of wireless access point.

Wireless access point 500 includes a transmitter 506. Transmitter 506 may be a RF transmitter or any other type of transmitter that transmits signals. Transmitter 506 may operate in accordance with protocols set forth in the 802.11 standard. As part of the signals broadcast by transmitter 506, transmitter 506 may broadcast either a permanent MAC address of the wireless access point or an anonymous MAC address generated in accordance with embodiments.

Wireless access point 504 may also include a secret key 504. The secret key may be encoded or stored in components of wireless access point 504. If transmitter 506 is configured to receive data, secret key 504 may be received from another device and stored in memory. The secret key may be received, for example and without limitation, from another networked device. In an embodiment, the secret key may be 128 bits.

Wireless access point 500 may also include a memory 510. Memory 510 may store encryption key 510. Memory 510 may also store the current anonymous MAC address, as well as a current counter value. Memory 510 may also store a unique pattern to be used as the two most significant bytes of an anonymous MAC address.

Wireless access point 500 also includes a processor 502. Processor 502 may be configured to generate an anonymous MAC address in part by encrypting a portion of the permanent MAC address. Processor 502 may also be configured to generate an anonymous MAC address in accordance with method 300 of FIG. 3. For example, processor 502 may encrypt certain bytes of the MAC address of FIG. 1 using an advanced encryption standard (AES) cipher or another type of encryption. Processor 502 may also perform an exclusive-or (XOR) operation with the 3 least significant bytes of the permanent MAC address and the result of the encryption, to generate the 3 least significant bytes of the anonymous MAC address.

Processor 502 may also generate a counter value between 0 and 255. The value generated by processor 502 may be used as the third most significant byte of an anonymous MAC address. Processor 502, in accordance with embodiments, may be configured to determine if a time period has elapsed between the generation of two anonymous MAC addresses. If the time period has elapsed, processor 502 may increment the currently counter value by 1. The time period may be measured in hours, days, or any other length of time. Processor 502 may, in accordance with embodiments, generate a new anonymous MAC address and include the new counter value in the new anonymous MAC address. If the current counter value is 255, the next counter value may be 0.

Wireless access point 500 may include further components, such as one or more antennae, switch ports, or other such components.

Figure 6:
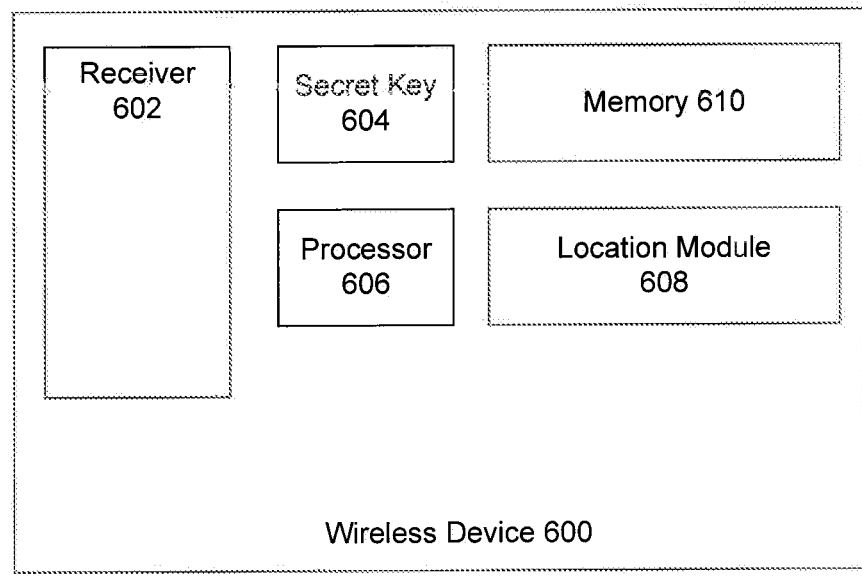
FIG. 6 is a diagram of an exemplary wireless device.

FIG. 6 is a diagram of a wireless device 600 in accordance with an embodiment. Wireless device 600 may be a mobile telephone or other device. Alternatively, components of wireless device 600 may be implemented in mobile devices.

Wireless device 600 may include a receiver module 602. Receiver module 602 may be a RF transceiver in accordance with the 802.11 wireless standard. RF transceiver 602 may be configured to receive and detect a MAC address of an access point.

Wireless device 600 may also include a secret key 604. In an embodiment, the secret key may be 128 bits. The secret key may change periodically and be received by receiver 602. The secret key may be stored by a memory.

Wireless device 600 also may include a memory 610. Memory 610 may be persistent storage, and may store the secret key 604. Memory 610 may also store one or more unique patterns to identify detected MAC addresses as anonymous MAC addresses, and store pairings which associate a unique pattern with an OUI.

Wireless device 600 may also include a processor 606. Processor 606 may be configured to determine a permanent MAC address associated with a received MAC address. Processor 606 may determine the permanent MAC address in accordance with method 400 of FIG. 4. For example, processor 606 may decrypt a portion of the received MAC address, and concatenate the decrypted portion of the received MAC address with a portion of the MAC address known to correspond to a manufacturers OUI.

Figure 7:
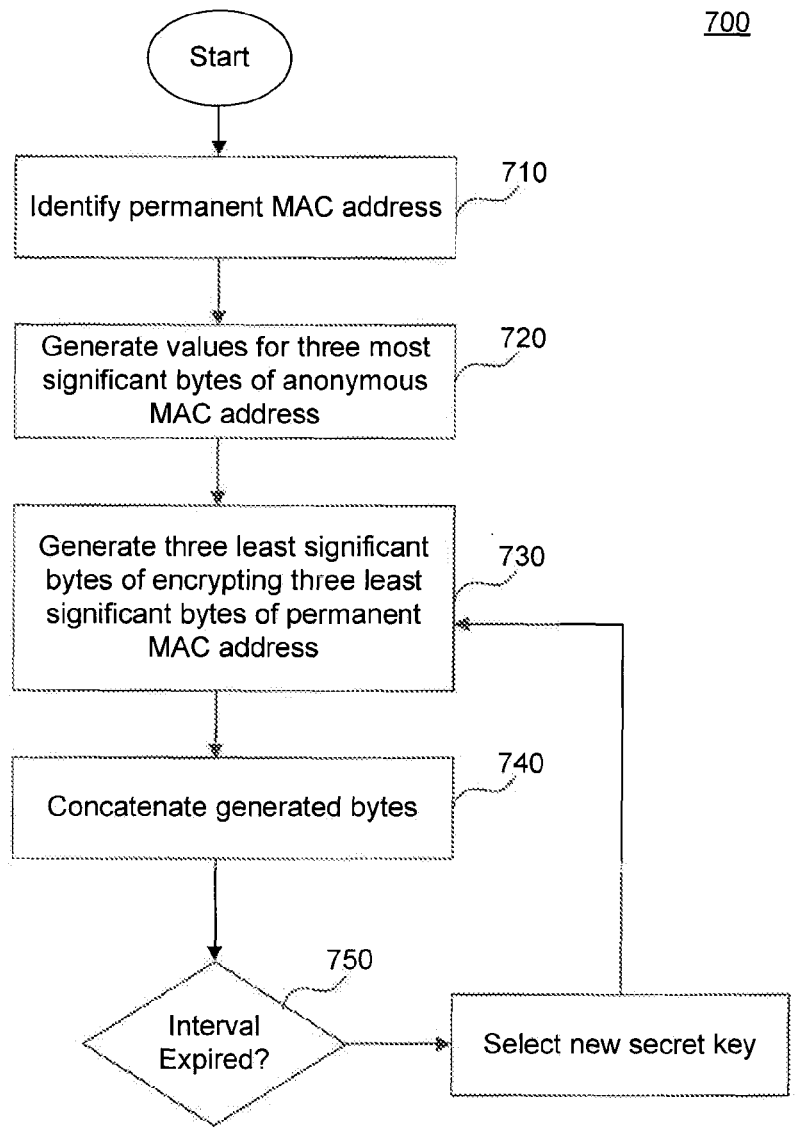
FIG. 7 is a flow diagram of a further exemplary method of generating an anonymous MAC address.

FIG. 7 is a flow diagram of a further method 700 for generating an anonymous MAC address. Method 700 may be implemented, for example and without limitation, by a wireless access point.

At block 710, a permanent MAC address is identified. The permanent MAC address may be associated with the wireless access point implementing method 700. The permanent MAC address may have a globally unique OUI in accordance with the IEEE standard for the three most significant bytes of the MAC address, and have the three least significant bytes of the MAC address assigned by the manufacturer of the wireless access point or other device.

At block 720, values for the three most significant bytes of the anonymous MAC address may be generated. The second least significant bit of the most significant byte may be set to 1, in accordance with the IEEE standard, to denote that the anonymous MAC address is locally administered. The remaining 23 bits of the three most significant bytes may correspond to a pattern previously selected by the manufacturer of a wireless access point implementing method 700.

At block 730, the remainder of the anonymous MAC address is generated. The remainder of the anonymous MAC address to be generated may be the three least significant bytes. The manufacturer who wishes to create anonymous MAC addresses may previously create and store a plurality of secret keys on the wireless access point. A portion of the permanent MAC address may be provided to an AES block cipher, along with one of the secret keys, to generate an output value. The secret key may be randomly selected from the plurality of secret keys. The output value may be used as the three least significant bytes of the anonymous MAC address.

At block 740, the anonymous MAC address is generated by concatenating the bits generated at block 720 and the result of the operation of block 730. The anonymous MAC address may be broadcast by the wireless access point implementing method 700.

At block 750, if an interval has expired, a new secret key may be selected. Blocks 730 and 740 may be repeated to generate a new anonymous MAC address.

Figure 8:
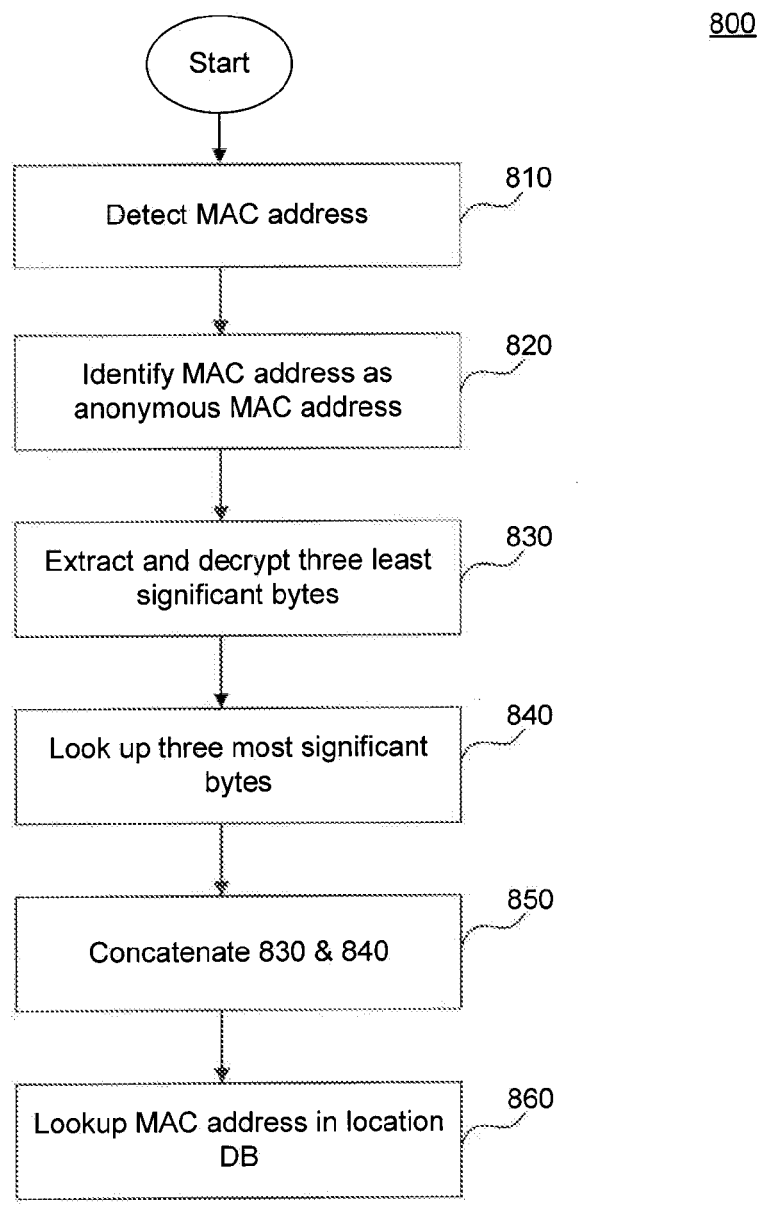
FIG. 8 is a flow diagram of a further exemplary method of determining a permanent MAC address.

FIG. 8 is a diagram of a method 800 for determining a permanent MAC address from an anonymous MAC address, in accordance with embodiments. Method 800 may be performed by a location aware device, such as a cellular phone utilizing A-GPS technology.

At block 810, a MAC address is detected. The detected MAC address may be associated with a wireless access point.

At block 820, the MAC address detected at block is determined to be an anonymous MAC address. The determination may be based on the first twenty four bits of the detected MAC address. For example, the second least significant bit of the most significant byte may be detected to be a value of 1. Based on this value, the detected MAC address may be determined to be a locally administered MAC address. The remainder of the first twenty four bits may correspond to a unique pattern specified by a manufacturer, in accordance with block 720 of method 700.

At block 830, the remainder of the detected MAC address is extracted. In accordance with the above embodiments, the three least significant bytes of the detected MAC address may be encrypted with a secret key. Thus, the value of the remainder of the detected MAC address may be provided to an AES block cipher, along with a previously stored encryption key, in order to decrypt the remainder of the detected MAC address.

In accordance with an embodiment, a wireless device implementing method 800 may store a plurality of secret keys. For example, a manufacturer of wireless access points and mobile device components may ensure that both types of devices have the same secret keys. Additionally, a manufacturer of wireless access points may partner with a second manufacturer of mobile devices, and provide the plurality of secret keys used to generate anonymous MAC addresses so that the mobile devices by the second manufacturer can use a particular location database. In order to decrypt the remainder of the detected MAC address at block 830, one of the plurality of secret keys may be selected.

At block 840, the three most significant bytes of the permanent MAC address may be determined based on the unique pattern specified by the manufacturer. For example, a lookup table may be stored in memory on a mobile device implementing method 800. The lookup table may assist in determining the three most significant bytes of the permanent MAC address that correspond to the unique pattern.

At block 850, the three most significant bytes determined at block 840 and the three least significant bytes determined at block 830 are concatenated to determine the permanent MAC address.

The permanent MAC address may be used to determine the location of a mobile device that has determined the permanent MAC address by looking it up in a location database as detailed above, at block 860. In the event the permanent MAC address is not found in a location database, the decryption at block 830 may be repeated with a different stored secret key until a correct permanent MAC address is determined, and successfully looked up in a location database.

Figure 9:
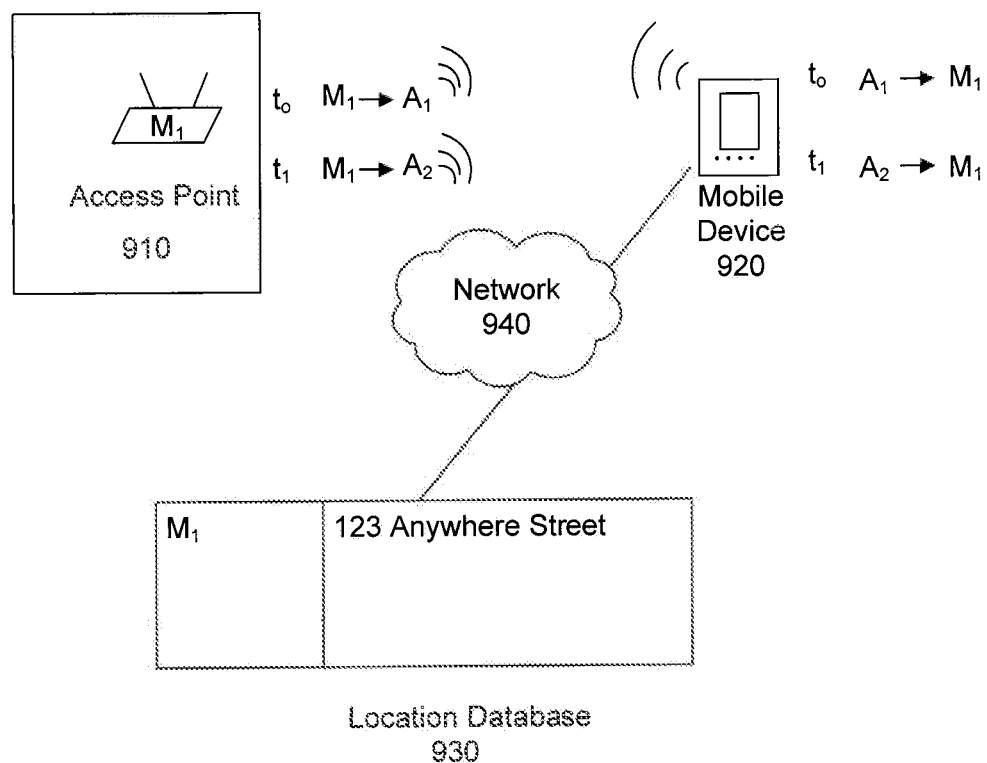
FIG. 9 is a diagram of an exemplary interaction between a wireless access point, mobile device, and location database.

FIG. 9 is a diagram of an exemplary interaction between a wireless access point, mobile device, and location database, in accordance with embodiments disclosed herein.

Access point 910 may be an access point with components such as those described with reference to FIG. 5. Access point 910 may have an associated permanent MAC address M1.

Mobile device 920 may be a mobile device, such as a cellular phone, with components such as those described with reference to FIG. 6. Mobile device 920 may be a location-aware mobile device that uses A-GPS to determine its location.

Location database 930 may be created by a location service provider and store MAC addresses and associated locations. For example, the location for access point 910 having MAC address M1 may be 123 Anywhere Street. Mobile device 920 may communicate with location database 930 over network 940. Network 940 may be a wireless network, such as a Wi-Fi, WiMax, CDMA, GSM, or other type of wireless network.

In accordance with methods 300 or 700, access point 910 may be configured to generate and broadcast anonymous MAC addresses. Thus, for example, at time t0, access point 910 may generate anonymous MAC address A1 from permanent MAC address M1. Access point 910 may then broadcast MAC address A1. After a particular interval has elapsed, at time t1, access point 910 may generate anonymous MAC address A2 from permanent MAC address M1 after updating a counter value, in accordance with method 300, or after selecting a new secret key, in accordance with method 700.

In accordance with methods 400 or 800, mobile device 920 may be configured to detect MAC addresses broadcast by access point 910. Further, mobile device 920 may be configured to determine the permanent MAC address associated with access point 910. In FIG. 9, this is shown as mobile device 920 converting anonymous MAC address A1 to M1. Thus, mobile device 920 may communicate with location database 930 to determine the location of MAC address M1. At time t1, if the anonymous MAC address of access point 910 has changed, mobile device 920 may again determine the permanent MAC address associated with the access point, and look up the location of the access point in location database 930.

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A wireless access point configured to communicate a locally administered media access control (MAC) address, the wireless access point comprising:
   a memory to store a first MAC address associated with the wireless access point, a secret key, and a pattern associated with providing the locally administered MAC address;
   a processor configured to provide the locally administered MAC address by changing a portion of the first MAC address using the secret key and the counter value, the change being in accordance with the pattern; and
   a transmitter configured to communicate the locally administered MAC address.

2. The wireless access point of claim 1, wherein the pattern is a sixteen bit pattern associated with a two most significant bytes of the locally administered MAC address and corresponds to a three most significant bytes of the first MAC address, and
   the processor is further configured to:
   encrypt the counter value with the secret key; and
   provide the locally administered MAC address by performing an exclusive disjunction of the encrypted counter value and three least significant bytes of the first MAC address.

3. The wireless access point of claim 1, wherein
   the processor is further configured to:
   determine whether the interval has elapsed;
   increment the counter value when the interval has elapsed; and
   provide an updated locally administered MAC address in accordance with the incremented counter value; and the transmitter is configured to broadcast the updated locally administered MAC address.

4. The wireless access point of claim 3, wherein the interval is 7 days.

5. A wireless access point configured to broadcast locally administered media access control (MAC) address, the wireless access point comprising:
   a memory to store a first MAC address associated with the wireless access point, a plurality of secret keys, and a pattern associated with providing the locally administered MAC address;
   a processor configured to provide the locally administered MAC address by encrypting a portion of the first MAC address with one of the plurality of secret keys, the encrypting being consistent with the pattern; and
   a transmitter configured to broadcast the locally administered MAC address.

6. The wireless access point claim 5, wherein the pattern is a twenty four bit pattern associated with a three most significant bytes of the locally administered MAC address, wherein the twenty four bit pattern corresponds to a three most significant bytes of the first MAC address.

7. A method for broadcasting a locally administered media access control (MAC) address for a wireless access point, the method comprising:
   determining a first MAC address associated with the wireless access point;
   providing a counter value at an interval;
   providing a portion of the locally administered MAC address by changing at least a portion of the first MAC address using a secret key;
   providing the locally administered MAC address based on a pattern associated with providing the locally administered MAC address, the counter value, and the provided portion; and
   broadcasting, by a transmitter of the wireless access point, the locally administered MAC address.

8. The method of claim 7, further comprising:
   generating the pattern associated with providing the locally administered MAC address by:
      specifying that the locally administered MAC address is locally administered; and
      specifying a unique identifier for a remainder of a two most significant bytes of the first locally administered MAC address that corresponds to a three most significant bytes of the first MAC address, wherein
   the changing comprises:
      encrypting the counter value with the secret key; and
      performing an exclusive disjunction operation with the encrypted counter value and a three least significant bytes of the first MAC address.

9. The method of claim 8, further comprising:
   incrementing the counter value;
   encrypting the incremented counter value;
   performing an exclusive disjunction operation with the encrypted incremented counter value and the three least significant bytes of the first MAC address;
   provide an updated locally administered MAC address based on the pattern associated with providing the locally administered MAC address, the incremented counter value, and the provided portion; and
   broadcasting the updated locally administered MAC address.

10. The method of claim 7, further comprising:
    determining whether the locally administered MAC address is currently being broadcast by a second wireless access point, wherein
    the broadcasting includes broadcasting the locally administered MAC address based on the determining whether the locally administered MAC address is being determining broadcast by the second wireless access point.

11. A wireless device configured to determine a permanent media access control (MAC) address of an access point, the wireless device comprising:
    a receiver configured to receive a MAC address associated with the access point;
    a memory to store a secret key and a pattern associated with determining the permanent MAC address of the access point; and
    a processor configured to:
       identify the received MAC address as an anonymous MAC address;
       determine a first portion of the permanent MAC address by determining a portion of the permanent MAC address that corresponds to the stored pattern;
       determine a second portion of the permanent MAC address using the anonymous MAC address and the secret key; and
       determine the permanent MAC address of the access point by concatenating the first portion of the permanent MAC address and the second portion of the permanent MAC address.

12. The wireless device of claim 11, further comprising:
    a location module configured to determine a location of the wireless device based on the determined permanent MAC address.

13. The wireless device of claim 11, wherein the pattern is a sixteen bit pattern associated with a two most significant bytes of the anonymous MAC address, the sixteen bit pattern corresponding to a three most significant bytes of the permanent MAC address.

14. The wireless device of claim 11, wherein the processor is further configured to:
    identify a third most significant byte of the received MAC address as a counter value;
    encrypt the counter value with the secret key, wherein
    to determine the second portion of the permanent MAC address, the processor is configured to resolve a three least significant bytes of the permanent MAC address by performing an exclusive disjunction operation with the encrypted counter value and a three least significant bytes of the anonymous MAC address, and
    to determine the first portion of the permanent MAC address, the processor is configured to resolve a three most significant bytes of the permanent MAC address by determining the three most significant bytes of the permanent MAC address that correspond to a sixteen bit pattern associated with the two most significant bytes of the anonymous MAC address.

15. A wireless device, comprising:
    a receiver configured to receive a media access control (MAC) address associated with an access point;
    a memory to store a plurality of secret keys and a pattern associated with determining a permanent MAC address associated with the access point; and
    a processor configured to:
       identify the received MAC address as an anonymous MAC address;
       determine a first portion of a permanent MAC address by determining a portion of the permanent MAC address that corresponds to the stored pattern;
       determine a second portion of the permanent MAC address by using one of the plurality of secret keys; and determine the permanent MAC address of the access point based on the first portion and the second portion.

16. A method for determining a location of a wireless device, the method comprising:
- detecting, by a processor of the wireless device, a media access control (MAC) address associated with a wireless access point;
- identifying the detected MAC address as an anonymous MAC address;
- resolving a first portion of a permanent MAC address of the wireless access point by determining a portion of the permanent MAC address that corresponds to a pattern associated with determining the permanent MAC address;
- resolving a second portion of the permanent MAC address of the wireless access point by using a secret key;
- determining the permanent MAC address by concatenating the first portion and the second portion; and
- determining, by the processor of the wireless device, the location of the wireless device based on the permanent MAC address and a location database.

17. The method of claim 16, wherein the pattern is a sixteen bit pattern associated with a two most significant bytes of the anonymous MAC addres, and
- the resolving the first portion further comprises:
  - resolving the first portion of the permanent MAC address by determining a three most significant bytes of the permanent MAC address that correspond to the sixteen bit pattern, and
- the resolving the second portion further comprises:
  - identifying a third most significant byte of the anonymous MAC address as a counter value;
  - encrypting the counter value with the secret key; and
  - resolving the second portion of the permanent MAC address by determining a three least significant bytes of the permanent MAC address by performing an exclusive disjunction operation with the encrypted counter value and a three least significant bytes of the anonymous MAC address.

* * * * *

UNITED STATES PATENT AND TRADEMARK OFFICE
CERTIFICATE OF CORRECTION

| | | |
|---|---|---|
| PATENT NO. | : 8,824,678 B2 | Page 1 of 1 |
| APPLICATION NO. | : 13/080399 | |
| DATED | : September 2, 2014 | |
| INVENTOR(S) | : Ochikubo et al. | |

It is certified that error appears in the above-identified patent and that said Letters Patent is hereby corrected as shown below:

In the Claims

In column 10, line 43, claim 1, please replace "provide the" with --provide a counter value at an interval, and to provide the--.

Signed and Sealed this
Twenty-seventh Day of January, 2015

Michelle K. Lee
*Deputy Director of the United States Patent and Trademark Office*